United States Patent
Trotochaud et al.

(10) Patent No.: US 12,195,370 B2
(45) Date of Patent: Jan. 14, 2025

(54) METHODS AND SYSTEMS FOR WASTEWATER TREATMENT

(71) Applicants: Duke University, Durham, NC (US); Triangle Environmental Health Initiative LLC, Durham, NC (US)

(72) Inventors: Lena Trotochaud, Durham, NC (US); Graham H. Miller, Durham, NC (US); Brian T. Hawkins, Durham, NC (US); Aaron Forbis-Stokes, Durham, NC (US); Tate Rogers, Durham, NC (US); Marielle DuToit, Durham, NC (US)

(73) Assignees: Duke University, Durham, NC (US); Triangle Environmental Health Initiative LLC, Durham, NC (US)

( * ) Notice: Subject to any disclaimer, the term of this patent is extended or adjusted under 35 U.S.C. 154(b) by 448 days.

(21) Appl. No.: 17/501,264

(22) Filed: Oct. 14, 2021

(65) Prior Publication Data
US 2022/0112103 A1   Apr. 14, 2022

Related U.S. Application Data

(60) Provisional application No. 63/091,453, filed on Oct. 14, 2020.

(51) Int. Cl.
*C02F 1/469* (2023.01)
*B01D 61/44* (2006.01)
(Continued)

(52) U.S. Cl.
CPC .......... *C02F 1/4693* (2013.01); *B01D 61/463* (2022.08); *B01D 61/50* (2013.01);
(Continued)

(58) Field of Classification Search
CPC .............. C02F 1/4693; C02F 2101/105; C02F 2101/16; C02F 2101/163; C02F 2103/002;
(Continued)

(56) References Cited

U.S. PATENT DOCUMENTS 3,268,441 A    8/1966  Lindstrom
3,341,441 A *  9/1967  Giuffrida .............. B01D 61/52
                                                  204/525
(Continued)

FOREIGN PATENT DOCUMENTS

WO   WO-2020257282 A1 * 12/2020  ............. B01D 61/46

OTHER PUBLICATIONS

Niftaliev et al. "Electrodialysis of Ammonium Nitrate Solution in Intensive Current Regimes" International Journal of Electrochemical Science, 2016, 11: 9057-9066 (Year: 2016).*
(Continued)

*Primary Examiner* — Luan V Van
*Assistant Examiner* — Alexander R. Parent
(74) *Attorney, Agent, or Firm* — Michael Best & Friedrich LLP

(57) ABSTRACT

The present disclosure describes systems and methods for wastewater treatment. In some embodiments, a system may include one or more of a pair of electrodes, a first membrane selectively permeable to a first wastewater nutrient, a second membrane selectively permeable to a second wastewater nutrient, and at least one spacing frame comprising a structural element, a gasket, and a flow channel. In some embodiments, the system may further include a septic tank.

20 Claims, 10 Drawing Sheets

(51) Int. Cl.
  *B01D 61/46* (2006.01)
  *B01D 61/50* (2006.01)
  *C02F 101/10* (2006.01)
  *C02F 101/16* (2006.01)
  *C02F 103/00* (2006.01)

(52) U.S. Cl.
  CPC ........ B01D 61/44 (2013.01); C02F 2101/105 (2013.01); C02F 2101/16 (2013.01); C02F 2101/163 (2013.01); C02F 2103/002 (2013.01); C02F 2103/005 (2013.01); C02F 2201/46115 (2013.01); C02F 2201/4613 (2013.01); C02F 2209/005 (2013.01)

(58) Field of Classification Search
  CPC .......... C02F 2103/005; C02F 2209/005; C02F 2307/00; C02F 2307/08; C02F 1/4695; C02F 2201/4613; B01D 61/463
  See application file for complete search history.

(56) References Cited

U.S. PATENT DOCUMENTS

| | | | |
|---|---|---|---|
| 4,673,494 A | 6/1987 | Krofta | |
| 5,558,753 A * | 9/1996 | Gallagher | C02F 1/4695 204/632 |
| 5,853,562 A | 12/1998 | Eki et al. | |
| 5,948,230 A | 9/1999 | McRae | |
| 6,274,020 B1 * | 8/2001 | Schmidt | B01D 61/50 204/639 |
| 9,227,857 B2 | 1/2016 | Sparrow et al. | |
| 9,493,368 B2 * | 11/2016 | Kirman | C02F 1/4602 |
| 10,934,194 B2 * | 3/2021 | Tabanpour | B01D 61/423 |
| 2003/0121787 A1 | 7/2003 | Reiter et al. | |
| 2007/0215474 A1 * | 9/2007 | Batchelder | B01D 61/423 204/524 |
| 2009/0127194 A1 | 5/2009 | Joo | |
| 2011/0284376 A1 | 11/2011 | Ng et al. | |
| 2014/0299551 A1 | 10/2014 | Xiong et al. | |
| 2015/0274562 A1 * | 10/2015 | Batstone | B01D 61/445 204/632 |
| 2016/0228820 A1 * | 8/2016 | Hayes | B01D 61/52 |
| 2017/0297939 A1 * | 10/2017 | Tseng | B01D 61/422 |
| 2019/0055141 A1 | 2/2019 | Cantrell | |
| 2021/0162347 A1 * | 6/2021 | Waugh | B01D 61/463 |

OTHER PUBLICATIONS

Gain et al. ("Ammonium nitrate wastewater treatment by coupled membrane electrolysis and electrodialysis" Journal of Applied Electrochemistry 32: 969-975, 2002) (Year: 2002).*
Tanaka ed. ("Ion Exchange Membranes Fundamentals and Applications" Chapter 2 Electrodialysis Reversal Membrane Science and Technology vol. 12, 2007 383-404) (Year: 2007).*
Mondor et al. ("Use of electrodialysis and reverse osmosis for the recovery and concentration of ammonia from swine manure" Bioresource Technology 99 (2008) 7363-7368) (Year: 2008).*
Niftaliev et al., "Electrodialysis of Ammonium Nitrate Solution in Intensive Current Regimes," International Journal of Electrochemical Science, 2016, 11: 9057-9066.
International Search Report and Written Opinion for Application No. PCT/US2021/054924 dated Jul. 27, 2022 (11 pages).
Allison, "Electrodialysis reversal in water reuse applications," Desalination, 1995, 103(1-2): 11-18.
Almadani, "Water desalination by solar powered electrodialysis process," Renewable Energy, 2003, 28(12): 1915-1924.
Beler-Baykal et al., "Nitrogen recovery from source-separated human urine using clinoptilolite and preliminary results of its use as fertilizer," Water Science & Technology, 2011, 63(4): 811-817.
Campione et al., "Electrodialysis for water desalination: A critical assessment of recent developments on process fundamentals, models and applications," Desalination, 2018, 434: 121-160.
Chao et al., "A feasibility study of industrial wastewater recovery using electrodialysis reversal," Desalination, 2008, 221(1-3): 433-439.
Charcosset, "A review of membrane processes and renewable energies for desalination," Desalination, 2009, 245(1-3): 214-231.
Cid et al., "Design and preliminary implementation of onsite electrochemical wastewater treatment and recycling toilets for the developing world," Environmental Science: Water Research & Technology, 2018, 4(10): 1439-1450.
Cooney et al., "Ammonia removal from wastewaters using natural Australian zeolite. II. Pilot-scale study using continuous packed col. process," Separation Science and Technology, 1999, 34(14): 2741-2760.
Cordell et al., "Towards global phosphorus security: A systems framework for phosphorus recovery and reuse options," Chemosphere, 2011, 84(6): 747-758.
Fane, "Membranes and the water cycle: Challenges and opportunities," Applied Water Science, 2011, 1(1-2): 3-9.
Geraldes et al., "Limiting current density in the electrodialysis of multi-ionic solutions," Journal of Membrane Science, 2010, 360(1-2): 499-508.
Ghunmi et al., "Grey water treatment systems: A review," Critical Reviews in Environmental Science and Technology, 2011, 41(7): 657-698.
Goodman et al., "A feasibility study of municipal wastewater desalination using electrodialysis reversal to provide recycled water for horticultural irrigation," Desalination, 2013, 317: 77-83.
Hanak et al., "Conceptual energy and water recovery system for self-sustained nano membrane toilet," Energy Conversion and Management, 2016, 126: 352-361.
Hawkins et al., "Electrochemical disinfection of repeatedly recycled blackwater in a free-standing, additive-free toilet," Water and Environment Journal, 2017, 31(4): 545-551.
Hawkins et al., "Remediation of suspended solids and turbidity by improved settling tank desing in a small-scale, free-standing toilet system using recyled blackwater," Water and Environment Journal, 2019, 33(1): 61-66.
Hawkins et al., "Improving energy efficiency of electrochemical blackwater disinfection through sequential reduction of suspended solids and chemical oxygen demand," Gates Open Research, 2019, 2: 50.
Hughes et al., "Electrodialysis reversal at Tutuka power station, RSA-seven years' design and operating experience," Water Science & Technology, 1992, 25(10): 277-289.
Jorgensen et al., "Ammonia removal from wastewater by ion exchange in the presence of organic contaminants," Water Research, 2003, 37(8): 1723-1728.
Koottatep et al., "Sanitation situations in selected Southeast Asian countries and application of innovative technologies," Environment, Development and Sustainability, 2018, 20(1): 495-506.
Kotoulas et al., "Zeolite as a potential medium for ammonium recovery and second cheese whey treatment," Water, 2019, 11(1): 136.
Kunzle et al., "An energy-efficient membrane bioreactor for on-site treatment and recovery of wastewater," Journal of Water, Sanitation and Hygiene for Development, 2015, 5(3): 448-455.
La Cerva et al., "Determination of limiting current density and current efficiency in electrodialysis units," Desalination, 2018, 445: 138-148.
Larsen et al., "Blue Diversion: A new approach to sanitation in informal settlements," Journal of Water, Sanitation and Hygiene for Development, 2015, 5(1): 64-71.
Massachusetts Department of Environmental Protection, "Title 5/Septic Systems: Financial Assistance Opportunities for System Owners," <https://www.mass.gov/guides/title-5septic-systems-financial-assistance-opportunities-for-system-owners> web page accessed Jul. 29, 2019.
Maurer et al. "Treatment processes for source-separated urine," Water Research, 2006, 40(17): 3151-3166.
Mercer et al., "Hybrid membrane distillation reverse electrodialysis configuration for water and energy recovery from human urine: An opportunity for off-grid decentralised sanitation," Journal of Membrane Science, 2019, 584: 343-352.

(56) References Cited

OTHER PUBLICATIONS

Miller et al., "A crossflow filtration system for constant permeate flux membrane fouling characterization," Review of Scientific Instruments, 2013, 84(3): 035003.
Mohan, "Across India, high levels of toxins in groundwater," <https://timesofindia.indiatimes.com/india/govt-body-finds-high-levels-of-groundwater-contamination-across-india/articleshow/65204273.cms> web page accessed Jul. 18, 2019.
Mondor et al., "Fouling characterization of electrodialysis membranes used for the recovery and concentration of ammonia from swine manure," Bioresource Technology, 2009, 100(2): 566-571.
Oztekin et al., "Wastewater treatment by electrodialysis system and fouling problems," The Online Journal of Science and Technology, 2016, 6(1): 91-99.
Penn et al., "Chapter 4: Phosphorus Sorption Materials (PSMs): The Heart of the Phosphorus Removal Structure" Design and Construction of Phosphorus Removal Structures for Improving Water Quality, 2018, 67-104.
Penn et al., "Chapter 8: Disposal of Spent Phosphorus Sorption Materials," Design and Construction of Phosphorus Removal Structures for Improving Water Quality, 2018, 207-222.
Pillion, "How much untreated sewage gets dumped in Alabama's Black Belt? UA team trying to find out," <https://www.al.com/news/2019/04/how-much-untreated-sewage-gets-dumped-in-alabamas-black-belt-ua-team-trying-to-find-out.html> web page accessed Jul. 26, 2019.
Rogers et al., "A granular activated carbon/electrochemical hybrid system for onsite treatment and reuse of blackwater, " Water Research, 2018, 144: 553-560.
Sellgren et al., "Development of an electrochemical process for blackwater disinfection in a freestanding, additive-free toilet," Research Triangle Park, 2017, 18 pages.
SFD Promotion Initiative, "SFD Manual vol. 1 and 2," Version 2.0, Apr. 2018, 121 pages.
Shi et al., "Nutrient recovery from pig manure digestate using electrodialysis reversal: Membrane fouling and feasibility of long-term operation," Journal of Membrane Science, 2019, 573: 560-569.
State of Hawaii, Department of Health, "Tax Credit Program and Qualifying Cesspools," <https://health.hawaii.gov/wastewater/home/taxcredit/> web page accessed Jul. 29, 2019.
Strande, "Faecal waste: the next sanitation challenge," Water 21, Jun. 2014, 16-18.
Talekar et al., "Sanitation of blackwater via sequential wetland and electrochemical treatment," NPJ Clean Water, 2018, 1(1): 14.
Tarpeh et al., "Comparing ion exchange adsorbents for nitrogen recovery from source-separated urine," Environmental Science & Technology, 2017, 51(4): 2373-2381.
Tarpeh et al., "Electrochemical stripping to recover nitrogen from source-separated urine," Environmental Science & Technology, 2018, 52(3): 1453-1460.
Theroux, "From Advanced Septic System Challenge to Sensor Challenge," U.S. Environmental Protection Agency, ORD/AED, 2019, 17 pages.
Thostenson et al., "Improved blackwater disinfection using potentiodynamic methods with oxidized boron-doped diamond electrodes," Water Research, 2018, 140: 191-199.
Trotochaud et al., "Non-biological methods for phosphorus and nitrogen removal from wastewater: A gap analysis of reinvented-toilet technologies with respect to ISO 30500," Gates Open Research, 2019, 3: 559.
U.S. Environmental Protection Agency, "A compilation of cost data associated with the impacts and control of nutrient pollution," US EPA, Reports and Assessments, 820-F-15-096, 2015, 110 pages.
United States Environmental Protection Agency, "Physical-Chemical Nitrogen Removal Wastewater Treatment," EPA 625/4-74-008, 1974, 30 pages.
United States Environmental Protection Agency, "Advanced Septic System Nitrogen Sensor Challenge, Prototype Testing—Phase II," <https://www.epa.gov/innovation/advanced-septic-system-nitrogen-sensor-challenge-phase-ii-prototype-testing> web page accessed Jul. 18, 2019.
United States Environmental Protection Agency, "Cesspools in Hawaii," <https://www.epa.gov/uic/cesspools-hawaii> web page accessed Jul. 26, 2019.
United States Environmental Protection Agency, "Voluntary National Guidelines for Management of Onsite and Clustered (Decentralized) Wastewater Treatment Systems," EPA 832-B-03-001, 2003, 62 pages.
Veerman et al., "Reverse electrodialysis: Evaluation of suitable electrode systems," Journal of Applied Electrochemistry, 2010, 40(8): 1461-1474.
Volpin et al., "Techno-economic feasibility of recovering phosphorus, nitrogen and water from diluted human urine via forward osmosis," Water Research, 2019, 150: 47-55.
Wang et al., "Impact hotspots of reduced nutrient discharge shift across the globe with population and dietary changes," Nature Communications, 2019, 10(1): 2627.
World Health Organization and the United Nations Children's Fund, "Progress on drinking water, sanitation and hygiene: 2017 update and SDG baselines," 2017, 114 pages.
Zhao et al., "Electrodialysis reversal for industrial reverse osmosis brine treatment," Separation and Purification Technology, 2019, 213: 339-347.

\* cited by examiner

METHODS AND SYSTEMS FOR WASTEWATER TREATMENT

CROSS-REFERENCE TO RELATED APPLICATIONS

This application claims the benefit of U.S. Provisional Application No. 63/091,453, filed Oct. 14, 2020. The entire contents of the above-identified application are hereby fully incorporated herein by reference.

BACKGROUND

The World Health Organization estimates that 4.5 billion people worldwide lack access to safely managed sanitation services, and among those, 2.3 billion lack even basic sanitation services. The prohibitive cost of sewered infrastructure has stimulated investment in developing non-sewered sanitation systems (NSSS). However, these types of systems can give rise to harmful algal blooms if wastewater is inadequately treated prior to discharge. In response to this threat, international standards for water discharge and reuse (ISO 30500) have recently been adopted which require 70% and 80% reductions in N and P, respectively, in NSSS effluent. Several effective, mature technologies for nutrient removal are widely employed at municipal wastewater treatment plants. However, a technological gap exists in providing similarly effective nutrient removal in NSSS while maintaining affordability and sustainability. Driven in particular by the finite supply and uneven global distribution of phosphate rock, there is also an increasingly urgent need for technologies which enable not only nutrient removal, but also nutrient recovery and reuse.

Membrane-based separation technologies, including electrodialysis, are emerging as promising methods of nutrient removal for NSSS. However, current solutions are limited to treatment of dilute wastewater streams (e.g., at municipal wastewater treatment plants) or wastewater with low organic loading from fecal contamination (e.g., source-separated urine, brackish water). All membrane-based technologies also suffer from limitations in the membranes themselves, including membrane fouling and poor selectivity. Hence, there is an ongoing need for improved methods of wastewater treatment.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

In an aspect, the present disclosure provides a method of treating wastewater comprising: providing a nutrient recovery (NR) system comprising a pair of electrodes and one or more NR channel units, each NR channel unit comprising: a first membrane selectively permeable to a first wastewater nutrient, a second membrane selectively permeable to a second wastewater nutrient, and at least one spacing frame comprising a structural element, a gasket, and a flow channel, wherein the first and second membranes, and the at least one spacing frame are positioned between the pair of electrodes; pumping wastewater into the NR system; applying a voltage to the pair of electrodes; and producing at least two output streams, wherein at least one of the output streams comprises a lower level of the first and/or second wastewater nutrient compared to the wastewater.

In some embodiments, the method further comprises removing foulant from the NR system. In some embodiments, removing the foulant from the NR system comprises switching polarity of the voltage. In some embodiments, switching polarity of the voltage comprises repeatedly applying a forward bias voltage and then applying a reverse bias voltage. In some embodiments, the forward bias voltage is applied for from 1 hour to 3 hours, then the reverse bias voltage is applied for from 0.5 minutes to 15 minutes. In some embodiments, a loss of performance of the first or second membrane is less than 10%. In some embodiments, the applied voltage is in the range of from 10 VDC to 50 VDC. In some embodiments, the applied voltage is in the range of from 20 VDC to 30 VDC.

In some embodiments, the method further comprises detecting changes in the system using a sensor and/or using a sensor to instruct a controller to change operating parameters of the NR system. In some embodiments, the method further comprises collecting one or more of the output streams for nutrient recovery, reuse, and/or discharge. In some embodiments, the at least two output streams comprises a diluate stream and a concentrate stream.

In some embodiments, the first membrane is a cation exchange membrane. In some embodiments, the second membrane is an anion exchange membrane. In some embodiments, the first wastewater nutrient comprises ammonium. In some embodiments, the second wastewater nutrient comprises phosphate and/or nitrate. In some embodiments, ammonium concentration in at least one of the output streams is less than 50%, less than 40%, less than 30%, less than 20%, less than 15%, less than 10%, or less than 5% of ammonium concentration in the wastewater. In some embodiments, phosphate concentration in at least one of the output streams is less than 30%, less than 20%, or less than 10%, of phosphate concentration in the wastewater. In some embodiments, nitrate concentration in the at least one of the output streams is less than 50%, less than 40%, less than 30%, less than 20%, or less than 10% of nitrate concentration in the wastewater. In some embodiments, the NR system is directly or indirectly connected with a septic tank. In some embodiments, the NR system is comprised in an onsite wastewater treatment system (e.g., engineered or advanced/improved onsite wastewater treatment system).

In another aspect, the present disclosure provides an onsite water treatment system comprising: a septic tank; and a nutrient recovery (NR) system comprising a pair of electrodes and one or more NR channel units, wherein each NR channel unit comprises: a first membrane selectively permeable to a first wastewater nutrient, a second membrane selectively permeable to a second wastewater nutrient, and at least one spacing frame comprising a structural element, a gasket, and a flow channel, wherein the first and second membranes, and the at least one spacing frame are positioned between the pair of electrodes, wherein the system is configured to flow wastewater from the septic tank to the NR system.

In some embodiments, the septic tank is directly or indirectly connected with the NR system. In some embodiments, the NR channel unit is configured to remove the first and second wastewater nutrients from wastewater or other aqueous solution through electrodialysis. In some embodiments, the first membrane is a cation exchange membrane. In some embodiments, the second membrane is an anion exchange membrane. In some embodiments, the first wastewater nutrient comprises ammonium. In some embodiments, the second wastewater nutrient comprises phosphate and/or nitrate.

In some embodiments, the spacing frame comprises at least one inlet opening and at least one outlet opening. In some embodiments, the NR channel unit comprises two spacing frames, wherein the spacing frames produce a diluate stream and a concentrate stream. In some embodiments, the spacing frame comprises a planar flow area with a length from 10 cm to 50 cm and a width from 20 cm to 100 cm. In some embodiments, the system further comprises one or more end channels with electrolyte solution. In some embodiments, the system further comprises a power supply configured to apply a cyclically reversed voltage. In some embodiments, the system further comprises a controller and at least one sensor configured to detect changes in the system, wherein the sensor is optionally one of a conductivity, ion, current, visual, and acoustic sensor. In some embodiments, the system comprises a plurality of NR units configured to operate in series or in parallel or a combination of the two.

One aspect of the present disclosure provides a nutrient recovery (NR) channel unit, the channel unit comprising, consisting of, or consisting essentially of a cation exchange membrane, an anion exchange membrane, and at least one spacing frame comprising a structural element, a gasket, and a flow channel, where the channel unit is configured to remove ammonium, nitrate, and/or phosphate from wastewater or other aqueous solution through electrodialysis.

In some embodiments, the spacing frame comprises at least one inlet opening and at least one outlet opening.

In some embodiments, the channel unit comprises two spacing frames, wherein the spacing frames produce two different effluent streams, one diluate and one concentrate.

In some embodiments, the spacing frame comprises a planar flow area of approximately 25 cm×50 cm.

Another aspect of the present disclosure provides a nutrient recovery (NR) cell stack, comprising, consisting of, or consisting essentially of one or more channel units according to the disclosure herein, a pair of electrodes at each end of the channel units, and an end channel with electrolyte solution. In some embodiments, the NR cell stack comprises 1 to 50, e.g., 3 to 50, 5 to 15, 10 to 20, 15 to 25, 20 to 30, 25 to 35, 30 to 40, 35 to 45, or 40 to 50 channel units.

Another aspect of the present disclosure provides a nutrient recovery (NR) system, comprising, consisting of, or consisting essentially of at least one NR cell stack and a power supply configured to apply a cyclically reversed voltage.

In some embodiments, an NR system comprises a controller and at least one sensor configured to detect changes in the system, wherein the sensor is optionally one of a conductivity, ion, current, visual, and acoustic sensor.

In some embodiments, an NR system comprises a plurality of NR cell stacks configured to operate in series or in parallel or a combination of the two.

Another aspect of the present disclosure provides a method of treating wastewater comprising providing an NR system according to the disclosure herein; pumping wastewater into the NR system; applying a voltage to the electrodes in a cyclical manner; and producing two different effluent streams, one diluate and one concentrate.

In some embodiments, applying a voltage comprises repeatedly applying a forward bias voltage for approximately 1-3 hours, then applying a reverse bias voltage for approximately 0.5-15 minutes.

In some embodiments, the applied voltage is in the range of approximately 10-50 VDC, and optionally in the range of 20-30 VDC.

In some embodiments, the method comprises detecting changes in the system using a sensor and/or using a sensor to instruct a controller to change operating parameters of the NR system.

In some embodiments, the method comprises collecting the effluent streams for nutrient recovery, reuse, and/or discharge.

Another aspect of the present disclosure provides all that is described and illustrated herein.

BRIEF DESCRIPTION OF THE DRAWINGS

The accompanying Figures, Examples and Appendix are provided by way of illustration and not by way of limitation. The foregoing aspects and other features of the disclosure are explained in the following description, taken in connection with the accompanying example figures (also "FIG.") relating to one or more embodiments, in which:

FIG. 8A: Experiment 1 (no polarity reversal applied after 27 h). Operating voltage=+22 V. FIG. 8B: Experiment 2 (polarity reversal applied every 2 h). Operation cycle in (8B) was (1) 105 min at +22 V followed by (2) 15 min at −22 V.

Figure 1:
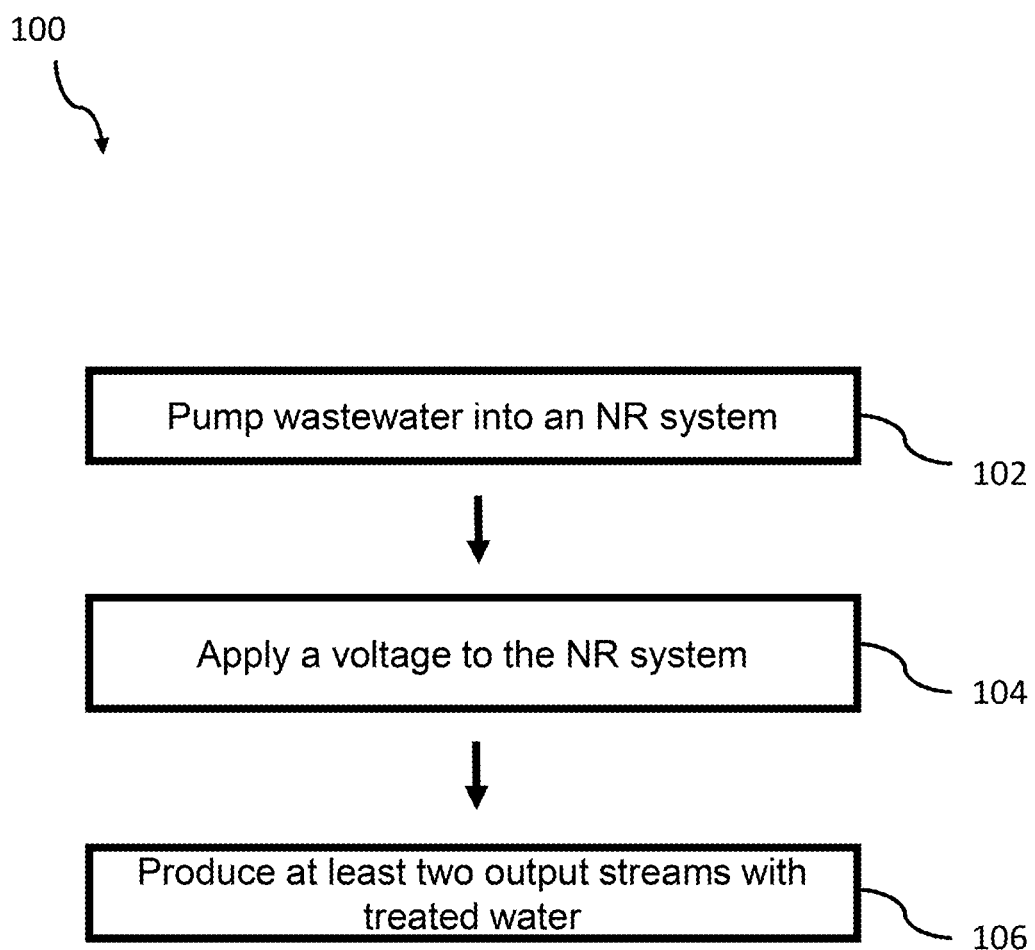
FIG. 1 shows an example method of treating wastewater.

The figures herein are for illustrative purposes only and are not necessarily drawn to scale.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

As used herein, blackwater includes wastewater from toilets, which may contain pathogens, feces, bodily fluids (e.g., urine, blood (e.g., menstrual blood)), tissues, water and toilet paper from flush toilets. Greywater includes wastewater from sinks, baths, washing machines, and other kitchen appliances apart from toilets. For example, greywater may result from washing food, clothing, dishes, as well as from showering or bathing. In some cases, it is preferred to keep the greywater separate from blackwater to reduce the amount of water that gets heavily polluted and to simplify treatment methods for the greywater.

Unless otherwise defined, all technical terms used herein have the same meaning as commonly understood by one of ordinary skill in the art to which this disclosure belongs.

The nutrients herein include any ions and related molecules that may be nutrients for agriculture and other applications. Examples of the nutrients include ammonium ($NH_4^+$) (as used herein, ammonium includes ammonia, $NH_3$), potassium ($K^+$), phosphate ($PO_4^{3-}$), nitrate ($NO_3-$), and nitrite ($NO_2-$). Nitrogen and phosphorus ions may be critical nutrients for agriculture. However, the uncontrolled release of these ions from effluent waste sources into surface waters can have detrimental effects. One such effect is eutrophication, which can lead to harmful algal blooms that have severe negative impacts on the environment, human health, and the economy. Ammonium ($NH_4^+$), phosphate ($PO_4^{3-}$), and nitrate ($NO_3^-$) are the most common ions of concern in these wastewater and are specifically called out in following discussion; however, NR is not exclusive to these ions only. In some aspects, the present disclosure addresses these and other challenges through the treatment of wastewater by a process that can be referred to as Electrodialytic Nutrient Recovery (ENR), or simply as a nutrient recovery (NR) system.

In general, the present disclosure provides methods and systems for treating water, e.g., wastewater or other aqueous solutions. In some embodiments, the systems may be a part of an onsite wastewater treatment system. An onsite (e.g., decentralized) wastewater treatment system may be a system that is used to treat wastewater from a home or business and return the treated wastewater back into the receiving environment. In some embodiments, an onsite system may be a septic system that has a septic tank (e.g., for partial treatment) followed by a soil absorption field. In other embodiments, the onsite system may have more advanced designs for higher levels of treatment.

In an aspect, the present disclosure provides methods of treating wastewater. In an example method, wastewater is collected and stored in a feed tank prior to entering the NR system. Because gravity settling of larger particulate matter can occur in the feed tank, an off-the-shelf or customized filter may optionally be used to remove suspended solids upstream of the NR system. During operation, liquid may be pumped into the NR channel units through an inlet. In some examples, the flow rate of solution through the NR channel unit may be generally constant and controlled by an influent pump. A cyclic voltage profile, as described herein, may be applied to the anode and cathode plates on either end of the NR channel unit. This may create diluate and concentrate solutions, which exit the unit at the outflow side of the channels. The outflow liquid from the individual concentrate channels may be optionally merged and collected in a storage tank as a "fertigation" (e.g., a combination of fertilizer and irrigation) solution or for storage until removal and safe disposal. Likewise, outflow from the diluate channels may be merged and collected in a storage tank for further processing, such as non-potable reuse or discharge.

FIG. 1 shows an example method 100 of treating wastewater using the systems disclosed herein. Step 102 comprises pumping wastewater into an NR system described herein. The wastewater may be blackwater, greywater, or a mixture thereof. Step 104 comprises applying a voltage to the NR system in a cyclical manner. When the wastewater passes through the NR system, at least two output streams are produced in Step 106.

In some embodiments, the method of treating wastewater comprises: providing a nutrient recovery (NR) system comprising a pair of electrodes and one or more NR channel units, each NR channel unit comprising: a first membrane selectively permeable to a first wastewater nutrient, a second membrane selectively permeable to a second wastewater nutrient, and at least one spacing frame comprising a structural element, a gasket, and a flow channel, wherein the first and second membranes, and the at least one spacing frame are positioned between the pair of electrodes; pumping wastewater into the NR system; applying a voltage to the pair of electrodes; and producing at least two output streams, wherein at least one of the output streams comprises a lower level of the first and/or second wastewater nutrient compared to the wastewater.

In some embodiments, at least one of the output streams (e.g., the diluate output stream) comprises a lower level of at least one nutrients compared to the wastewater. In some embodiments, at least one of the output streams (e.g., the concentrate output stream) comprises a higher level of at least one nutrients compared to the wastewater. For example, the output streams may comprise a concentrate stream in which nutrient(s) in the wastewater is enriched and a diluate stream with reduced level of nutrient(s) compared to the wastewater.

In some embodiments, the concentration of one or more nutrients in at least one of the output streams (e.g., the diluate streams) may be less than 50%, less than 40%, than less than 30%, less than 20%, less than 15%, less than 10%, less than 5%, or less than 1% of the concertation of the nutrient(s) in the wastewater. In some examples, the ammonium concentration in at least one of the output streams is less than 50%, less than 40%, less than 30%, less than 20%, less than 15%, less than 10%, less than 5%, or less than 1% of the ammonium concentration in the wastewater. In some examples, the phosphate concentration in at least one of the output streams is less than 50%, less than 40%, than less than 30%, less than 20%, less than 15%, less than 10%, less than 5%, or less than 1% of the phosphate concentration in the wastewater. In some examples, the nitrate concentration in at least one of the output streams is less than 50%, less than 40%, less than 30%, less than 20%, less than 15%, less than 10%, less than 5%, or less than 1% of the nitrate concentration in the wastewater.

In some embodiments, the concentration of one or more nutrients in at least one of the output streams (e.g., the concentrate streams) may be greater than 5%, greater than 10%, greater than 20%, greater than 30%, greater than 40%, or greater than 50% of the concertation of the nutrient(s) in the wastewater. In some examples, the ammonium concentration in at least one of the output streams is greater than 5%, greater than 10%, greater than 20%, greater than 30%, greater than 40%, or greater than 50% of the ammonium concentration in the wastewater. In some examples, the phosphate concentration in at least one of the output streams is greater than 5%, greater than 10%, greater than 20%, greater than 30%, greater than 40%, or greater than 50% of the phosphate concentration in the wastewater. In some examples, the nitrate concentration in at least one of the output streams is greater than 5%, greater than 10%, greater than 20%, greater than 30%, greater than 40%, or greater than 50% of the nitrate concentration in the wastewater.

In some embodiments, the method may further comprises removing foulant from the NR system, e.g., from the membranes and/or other components in the NR units. For example, the method may comprise switching polarity of the voltage, e.g., with the voltage applied in a cyclical manner.

In another aspect, the present disclosure provides NR systems for treating wastewater. An NR system may comprise a pair of electrodes and one or more NR units positioned between the electrodes. An NR channel unit may comprise one or more membranes selectively permeable to certain wastewater nutrients. In some embodiments, the membranes may be ion exchange membranes that are semipermeable membranes and only selectively allow certain ions to permeate through the membrane while blocking other ions and/or molecules. For example, the ion exchange membrane may be a cation exchange membrane that only selectively allows cations to permeate through the membrane while blocking anions. In another example, the ion exchange membrane may be an anion exchange membrane that only selectively allows anions to permeate through the membrane while blocking cations.

In some embodiments, the ion exchange membranes may have selectivity on the basis of the ions' charge numbers. In some examples, the cation exchange membranes may be selective for ions with a monovalent (+1) or multivalent (e.g., +2, +3, +4, etc.) charge. In some examples, the anion exchange membranes may be selective for ions with a monovalent (−1) or multivalent (e.g., −2, −3, −4, etc.) charge.

An NR channel unit may further comprise one or more spacers and structural components. In some embodiments, an NR channel unit may comprise a cation exchange membrane, an anion exchange membrane, and at least one spacing frame comprising a structural element, a gasket, and a flow channel. When comprised in an NR system herein, the cation exchange membrane, the anion exchange membrane, and the at least one spacing frame may be positioned between two electrodes in the NR system.

In some embodiments, an onsite water treatment system may include: a septic tank; and a nutrient recovery (NR) system comprising a pair of electrodes and one or more NR channel units, wherein each NR channel unit comprises: a first membrane selectively permeable to a first wastewater nutrient, a second membrane selectively permeable to a second wastewater nutrient, and at least one spacing frame comprising a structural element, a gasket, and a flow channel, wherein the first and second membranes, and the at least one spacing frame are positioned between the pair of electrodes, wherein the system is configured to flow wastewater from the septic tank to the NR system. At least two output streams (a diluate stream and a concentrate stream) may be produced after the wastewater flows through the NR system. The diluate stream with reduced level of nutrient(s) compared to the wastewater may be released to the environment or recycled. The concentrate stream with enriched level of nutrient(s) may be used to recover the nutrient(s).

In some embodiments, an onsite water treatment system may include: an advanced treatment system with a primary tank and additional treatment steps; and a nutrient recovery (NR) system comprising a pair of electrodes and one or more NR channel units, wherein each NR channel unit comprises: a first membrane selectively permeable to a first wastewater nutrient, a second membrane selectively permeable to a second wastewater nutrient, and at least one spacing frame comprising a structural element, a gasket, and a flow channel, wherein the first and second membranes, and the at least one spacing frame are positioned between the pair of electrodes, wherein the system is configured to flow wastewater from a point in the advanced treatment system to the NR system. At least two output streams (a diluate stream and a concentrate stream) may be produced after the wastewater flows through the NR system. The diluate stream with reduced level of nutrient(s) compared to the wastewater may be released to the environment or recycled. The concentrate stream with enriched level of nutrient(s) may be used to recover the nutrient(s). One or both of the diluate and concentrate streams may be returned to previous steps in the advanced treatment system for further treatment.

Figure 2:
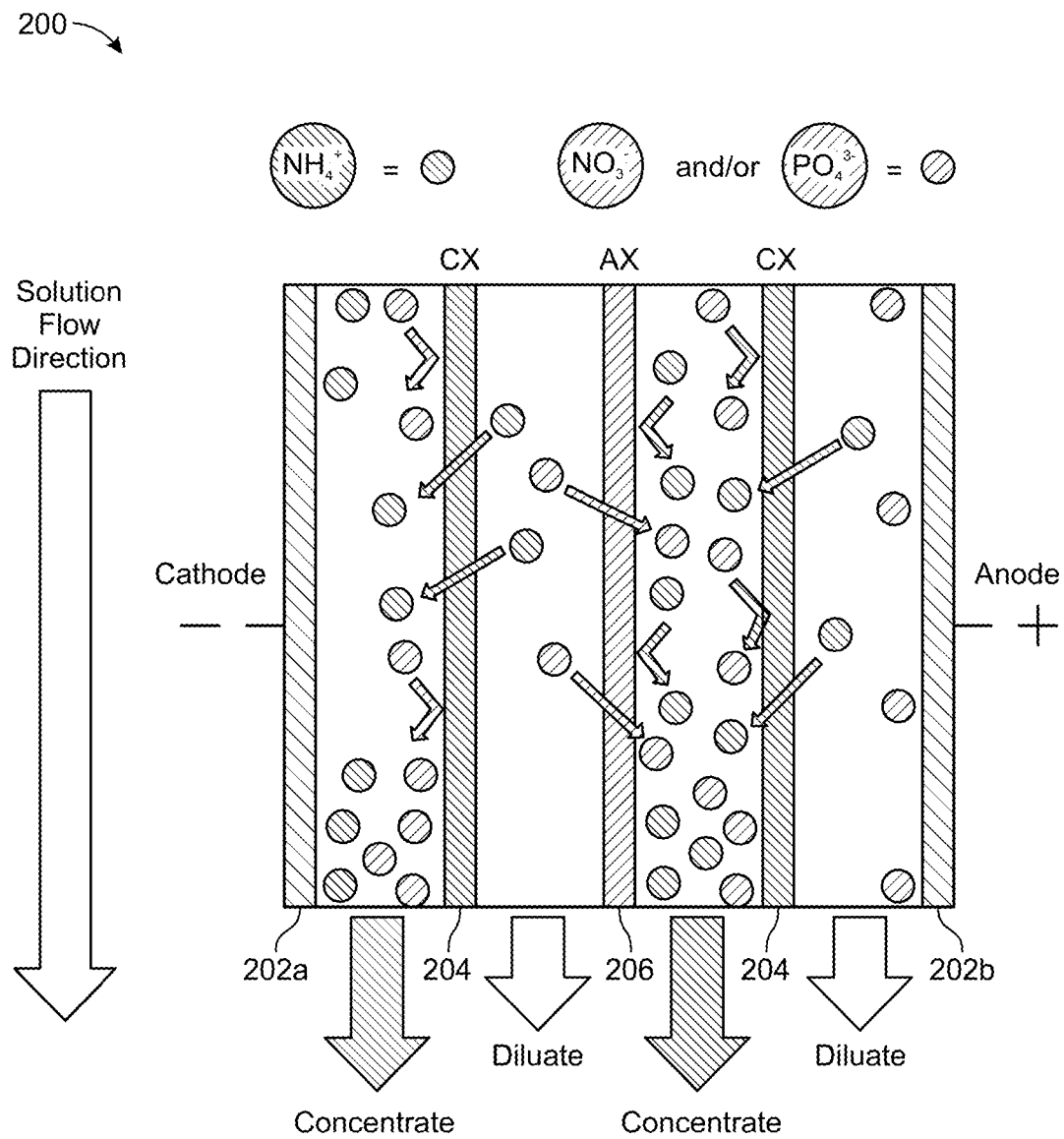
FIG. 2 is a schematic illustration of a general electrodialysis process.

FIG. 2 illustrates ion movement during electrodialysis inside an example NR channel unit 200. In this example, a potential is applied between the anode 202b and cathode 202a, and ions (e.g., ammonium cation, nitrate anion, and/or phosphate anion) are drawn toward the electrode with an opposite charge. The movement of the ions is selectively blocked by cation-exchange (CX) 204 and anion-exchange (AX) membranes 206, resulting in concentrate and diluate effluent streams. This type of membrane-based electrodialysis systems may be used for applications such as desalination and removing nutrients from wastewater. Conventional electrodialysis systems may often be subject to degradation over time and are not used in systems with high levels of organic material. In some embodiments, the present disclosure provides a novel electrodialysis system with an electrodialysis reversal (EDR) system, which may overcome the limitations by conventional electrodialysis systems.

Figure 3:
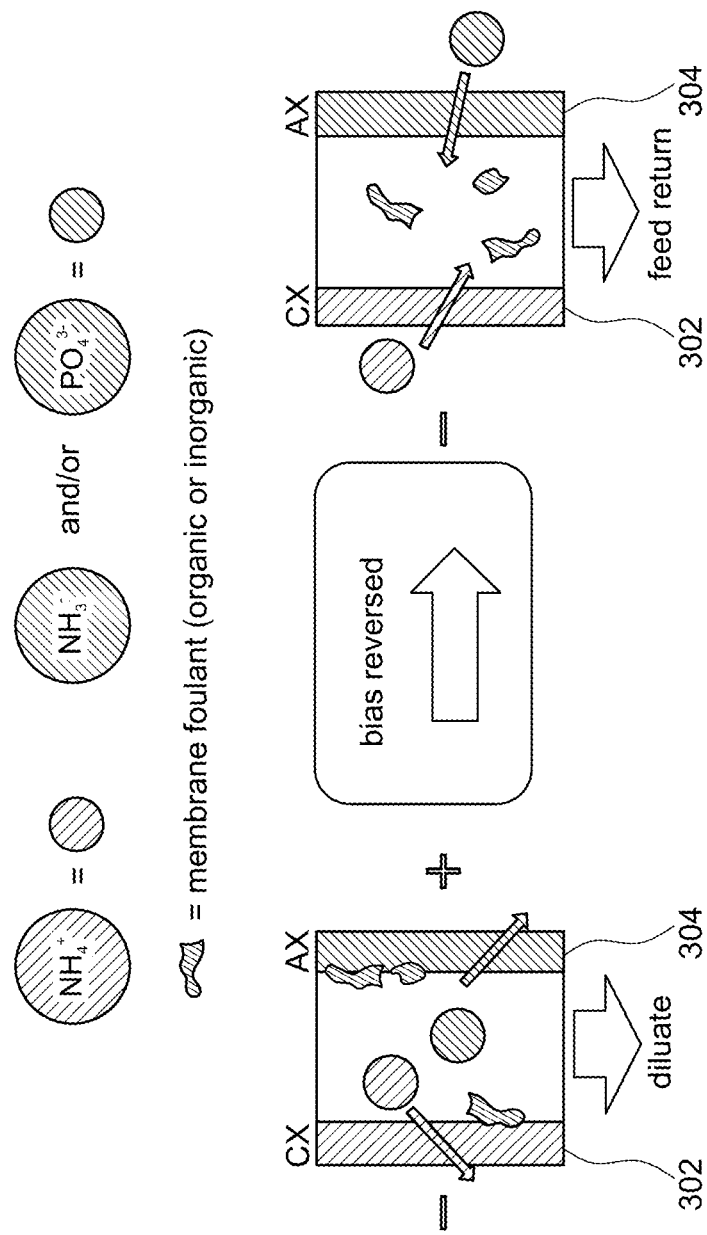
FIG. 3 is a schematic illustration of an electrodialysis reversal process.

An example EDR process is illustrated in FIG. 3, which shows an example process of electrodialysis reversal for membrane cleaning. In this example, during standard operation (left), the applied bias between the cathode and anode creates diluate and concentrate streams as shown in FIG. 2. Periodically, the direction of the electrical bias is switched for electrodialysis reversal (right). The flow of ions is reversed, forcing foulants (both organic and inorganic) off of the membrane surfaces. All effluent from the ENR cell is redirected to the feed tank during electrodialysis reversal.

In some embodiments, removing foulants from the membranes may help maintain the performance of the membranes. In some examples, when used in the methods herein, the ion exchange membranes (the cation exchange membrane or anion exchange membrane) in the NR units may have a loss of performance following six months of use of less than 50%, less than 20%, less than 10%, less than 5%, or less than less than 1%, or substantially no loss of performance. The loss of performance of the ion exchange membranes may be determined by the capability of the membranes in concentrating or removing one or more nutrients from the wastewater, e.g., by the method described in the Example.

Figure 4A:
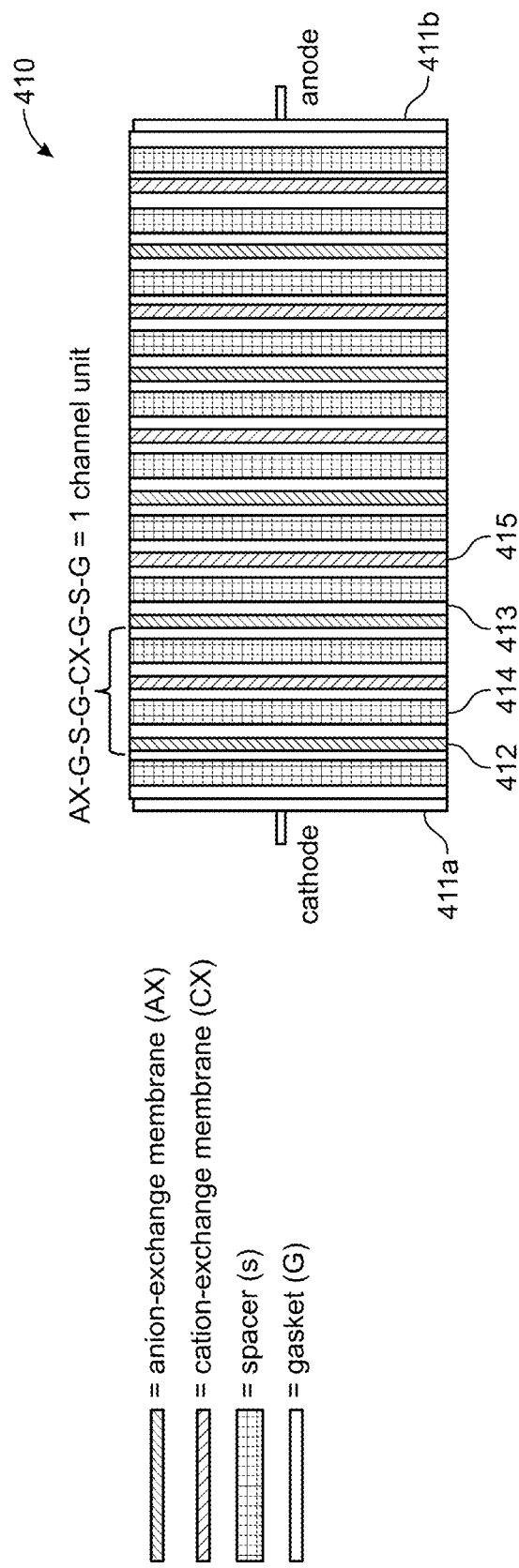
FIGS. 4A-4C are illustrations of NR systems in accordance with one embodiment of the present disclosure.
Figure 4C:
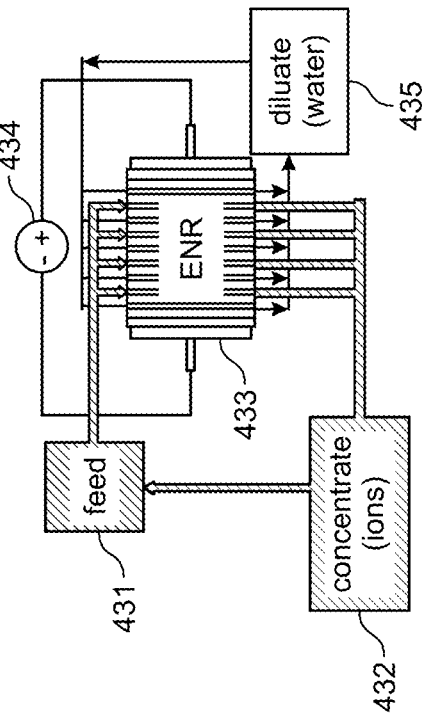
Figure 4B:
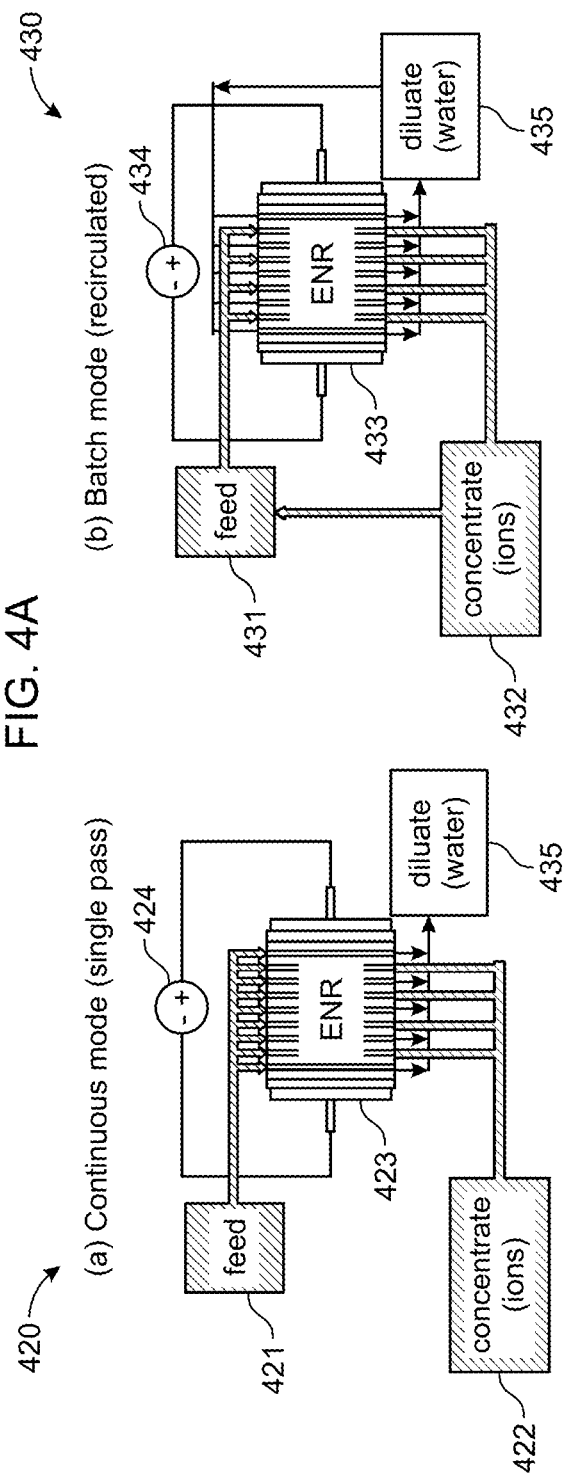

FIGS. 4A-4C depict an example embodiment of an NR system 410 according to the present disclosure. In this example, the system comprises at least one NR cell stack. The NR cell stack comprises individual "channel units" of alternating cation- and anion-exchange membranes arranged in a particular order. Each NR channel unit produces a diluate stream and a concentrate stream. The wastewater to be treated is stored in a feed tank and pumped to the ENR cell stack. Concentrate and diluate effluent streams are stored in separate tanks. Arrows show the direction of liquid flow between tanks for continuous (FIG. 4B) and batch (FIG. 4C) operating modes. This enables simultaneous recovery of two high-value product solutions: a nutrient-rich (e.g., an ammonium- and/or phosphate-rich) concentrate that can be as fertilizer or that can be sequestered for safe disposal, and a nutrient-stripped water diluate that can be readily disinfected for non-potable reuse (e.g., toilet flushing) or discharge.

In the example embodiment of FIG. 4A, an NR cell stack contains repeating NR channel units. Each NR channel unit comprises a cation exchange membrane (CX) 415, anion exchange membrane (AX) 412, impermeable gaskets (G) 413, and spacers (S) 414. In some examples, an NR channel unit comprises components that are arranged in the order of: AX-G-S-G-CX-G-S-G. However, it is to be understood that the components in an NR channel unit may be arranged in any order suitable for the applications.

The impermeable gasket 413 may be, for example, a silicone or similar material, and the spacers 414 can be a conventional woven fabric material, or a custom spacer as disclosed herein.

In some embodiments, each NR channel unit may have at least two effluent streams, including one diluate and one concentrate. In some embodiments, half of the outlets in a cell stack may be diluate, and half may be concentrate. Each unit outflow may be optionally combined downstream with corresponding outflows of other NR channel units in the stack. The NR cell stack may be capped at each end by the electrodes. In some examples, on one end (e.g., the cathode end as shown in FIG. 4A), the electrode may be separated from the end ion-exchange membrane by a final G-S end channel. The end channels closest to the electrodes may be filled with electrolyte solution (e.g., $Na_2SO_4$). The electrolyte solution may be recirculated between the anode and cathode end channels to minimize electrode scaling/fouling.

In this non-limiting example embodiment, there are five repeating NR channel units in the NR cell stack. In other embodiments, the number of NR channel units may be modified according to the application. For example, additional channel units may be added to increase the liquid processing capacity for larger scale applications, or fewer may be used for low-use wastewater streams. For example, an NR cell stack may comprise at least 1, at least 2, at least 3, at least 4, at least 5, at least 6, at least 7, at least 8, at least 9, at least 10, at least 15, at least 20, at least 30, or at least 50 NR channel units.

Additionally, two or more stacks or NR channel units may be combined and run in parallel and/or series. In some examples, when two or more of the stacks or NR channel units are combined and run in parallel, the wastewater may flow through the stacks or NR channel units at the same time. In some examples, when two or more of the stacks or NR channel units are combined and run in series, the wastewater may flow through the stacks or NR channel units one at a time. In some examples, some of the stacks or NR channel units may be combined and run in parallel and some of the stacks or NR channel units in the system may be combined and run in series.

Figure 5:
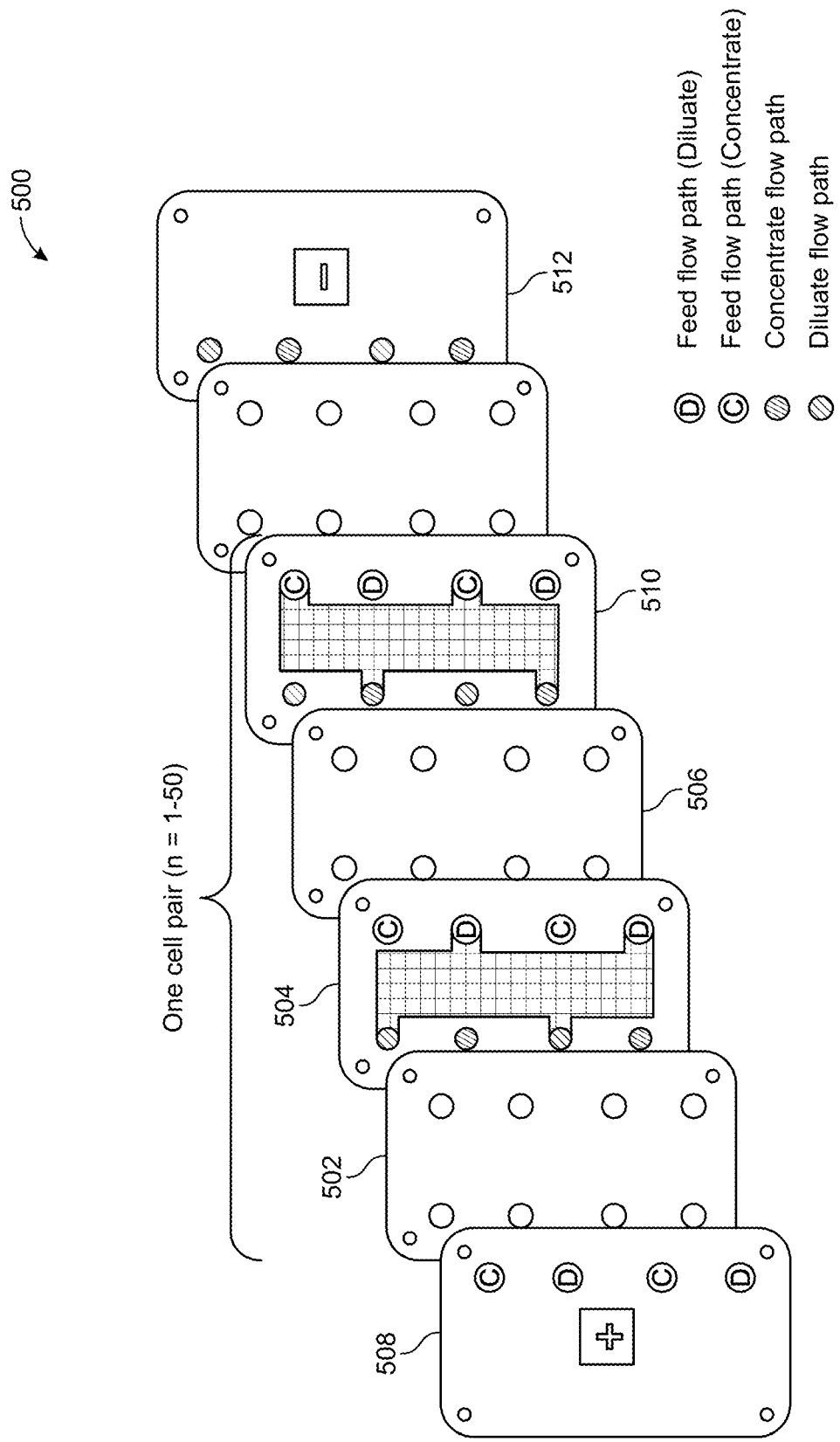
FIG. 5 is a schematic drawing of an NR channel unit in accordance with one embodiment of the present disclosure.

FIG. 5 is an exploded schematic drawing of an example NR channel unit 500 according to the disclosure herein. In this example, a NR channel unit 500 comprises a cation exchange membrane 502 and anion exchange membrane 506, which are separated from one another by a rigid spacing frame 504 (element labeled "Polycarbonate sheet"). A gasket material (not shown) may be integrated into the spacing frame or included as a separate part. A second spacing frame (not shown) may also be part of the NR channel unit, either to the left or right of the membranes. Also shown in FIG. 5 is a conductive plate 508 that serves as an electrode, and an end channel (to the right of the NR channel unit). The electrodes may be any suitable material, such as graphite or titanium. Additionally, electrodes may optionally be modified (e.g., by decoration with catalysts for water oxidation or hydrogen evolution) to decrease the operating voltage.

In some embodiments the spacing frame at least may advantageously combine the functions of a structural element, a gasket, and a flow channel in a single element. The frame additionally may have at least one inlet opening and outlet opening, which allow liquid to pass through. The inlet and outlet openings may be of any suitable type, such as threaded or barbed fittings, quick disconnects, pipe fittings, etc. As the liquid enters the flow channel and is exposed to the membranes, a diluate or a concentrate effluent may be produced depending on the orientation of the membranes in combination with the polarization direction of the electrodes. A plurality of cell units may be repeated in alternating fashion as described hereinabove to form an NR cell stack.

Figure 6:
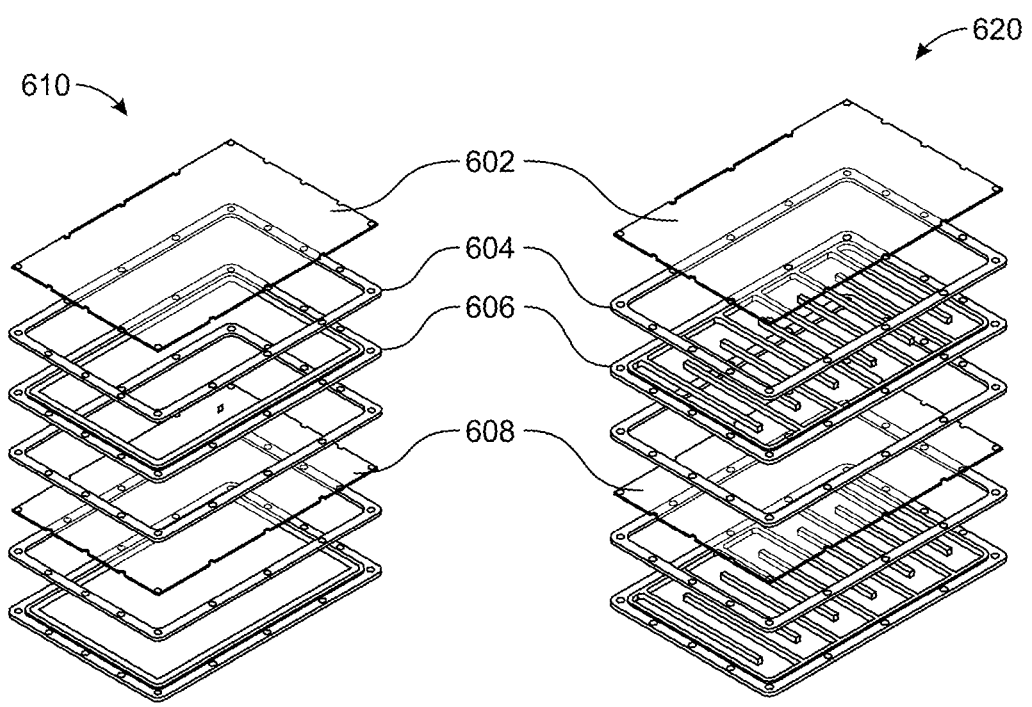
FIG. 6 is a schematic drawing of another NR channel unit in accordance with one embodiment of the present disclosure.

FIG. 6 depicts additional embodiments of an NR channel unit, which illustrate details of example spacer configurations. In the embodiment 610 on the left, a membrane-separating mesh material is integrated within the spacer frame 606 to provide structural support while maximizing liquid-membrane contact surface area with the ion exchange membranes 602 and 608. In the embodiment 620 on the right, alternating support structures of the spacer frame 606 promote tortuous flow through the channel to increase effective residence time with the ion exchange membranes 602 and 608. In both embodiments, a gasket 604 may be recessed within the spacer to minimize the fluid channel width between the ion exchange membranes 602 and 608. The gasket 604 may be assembled to the spacer in any suitable manner (e.g., fitted groove, sealant, over molding, etc.).

An NR system may be configured in several ways in accordance with the disclosure. For example, the system can run in a continuous, single-pass flow configuration or, to further concentrate nutrient ions in the concentrate stream, it can operate in a recirculating batch mode (see, e.g., FIGS. 4B and 4C). It is also possible for a system to comprise a plurality of stacks that operate in a combination of continuous and recirculating flow. In some embodiments, the influent pump from a feed tank may be a peristaltic pump, e.g., with a flow rate from 10 mL/min to 15 mL/min, such as approximately 12 mL/min.

The design parameters of the spacing frame may also be customized for the application, taking into account aspects such as feed flow volume and rate, wastewater content, applied voltage, etc. In a non-limiting example, the frames can be made of a non-conducting material such as polycarbonate, with an opening (e.g., in-plane area). In some examples, the opening may have a length from 10 cm to 50 cm and a width from 20 cm to 100 cm, e.g., approximately 25 cm×50 cm. The width of the channel can likewise vary accordingly. For example, the width of the spacer may be in the range of from 0.1 cm to 0.5 cm. Other dimensions and configurations are also possible without departing from the scope of the invention.

In some embodiments, one of the advantages of the disclosed spacers is that they provide modularity and scalability to the NR system. Each system may be sized and assembled to meet the needs of the prescribed application. For example, a basic system for a low-volume residential application may have a small number of NR channel units that occupy small footprint. Additionally in some embodiments, unlike conventional mesh channels, the spacers may be a structural component. For example, the spacers may thus optionally include internal and external features such as membrane mounting features, connection features to adjacent cells, mounting or hanging points, etc. This may allow a robust and compact design by eliminating redundant elements.

In some embodiments, the NR systems disclosed herein may optionally include components for powering the system and a prescribed voltage application. The power system may include one or more of: a power source, a controller, and sensors for monitoring the membranes. In general, the power system may provide an electrical bias between the anode and cathode, and the polarity is periodically reversed. In some embodiments, this may encourage nutrient release and helps prevent clogging or fouling of the membranes.

In some embodiments, electrodialysis may be effected by the application of a constant direct current (DC) voltage to the electrodes. The power source may be any suitable source, such as a conventional DC power supply. In some embodiments, the power source may be a renewable or green energy (e.g., wind, solar). The direction of the applied bias may be reversed in a cyclical manner via the controller, in order to mitigate membrane fouling. In an embodiment, a voltage of from 1V to 50V, from 5V to 40V, from 10V to 35V, or from 25V to 35V may be applied to the electrodes. In some embodiments, a voltage of 30V may be applied. The voltage may be in the unit of volts of direct current (VDC). A forward bias may be applied for from 0.1 hour to 10 hours, from 0.5 hour to 5 hours, from 1 hour to 5 hours, or from 1 hour to 3 hours. In some examples, a reverse bias voltage may be applied for a shorter time period, such as from 0.5 minute to 30 minutes, from 5 minutes to 20 minutes, or from 5 minutes to 15 minutes. In some embodiments, a forward bias of 22 VDC may be applied for two hours, and a reverse bias voltage of 22 VDC may be applied for 10 minutes. In some embodiments, the magnitude of the forward and reverse biases voltage may be identical, or it may be different, depending on the fouling mitigation strategy. For example, a reverse bias voltage may be applied with higher magnitude than the forward bias to encourage foulant removal on shorter time scales. During the electrodialysis reversal cycle, the effluent may be recirculated into the feed tank.

In some embodiments, the forward and reverse bias voltage application steps may be repeated indefinitely or for a prescribed time period. Optionally, the system may include sensors that detect (e.g., automatically detect) when the effectiveness of the NR system is beginning to degrade. These sensors may be of any suitable type that detect relevant changes in the system. Some example sensors include conductivity, ion, and/or current sensors. Alternately or additionally, visual or acoustic sensors may be used to detect physical characteristics of the outflow (e.g., turbidity). The controller monitors the sensor (e.g., electronically) and may be programmed to take an action if the sensor exceeds a prescribed threshold. For example, if a sensor indicates that the electrical current decreases below a minimum threshold, or that the conductivity of the diluate increases above a maximum threshold, the time between reversal intervals may be shortened. Some other possible actions may be taken as well, for example, increasing the voltage, initiating a flush or cleaning operation, and/or creating an operator alert. Additional possible actions will be evident to those of skill in the art.

It is noted that the concentration of nutrient(s) (e.g., ammonium, potassium, phosphate, nitrate) in the wastewater stream may affect the applicability of the nutrient-rich stream. For example, if the concentration of the target ions is too low, the permeate solution may be too dilute to serve as an effective fertilizer product. Conversely, wastewater streams with very high concentrations of organic components may increase fouling rate of electrode and/or membrane materials, or it may increase the amount of power required to operate the NR cell. Hence, in these and other cases it is within the scope of the disclosure to include chemical surface modification of the membranes, or to implement alternative membrane materials, to increase selectivity or decrease fouling.

In some embodiments, an advantage of the systems and methods described herein is that they do not require the use of urine diversion systems prior to nutrient removal and recovery. Thus, in these cases, standard household plumbing fixtures (e.g., pedestal or squat plate toilets) are compatible with the NR system, and retrofits with existing plumbing infrastructure (e.g., septic tanks) are possible.

Figure 7A:
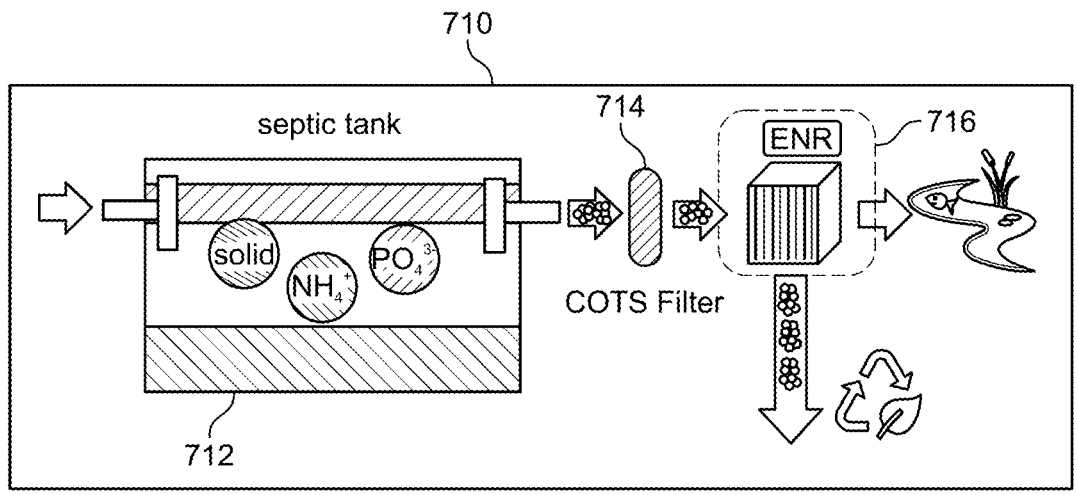
FIGS. 7A and 7B show exemplary NR systems in accordance with the present disclosure.
Figure 7B:
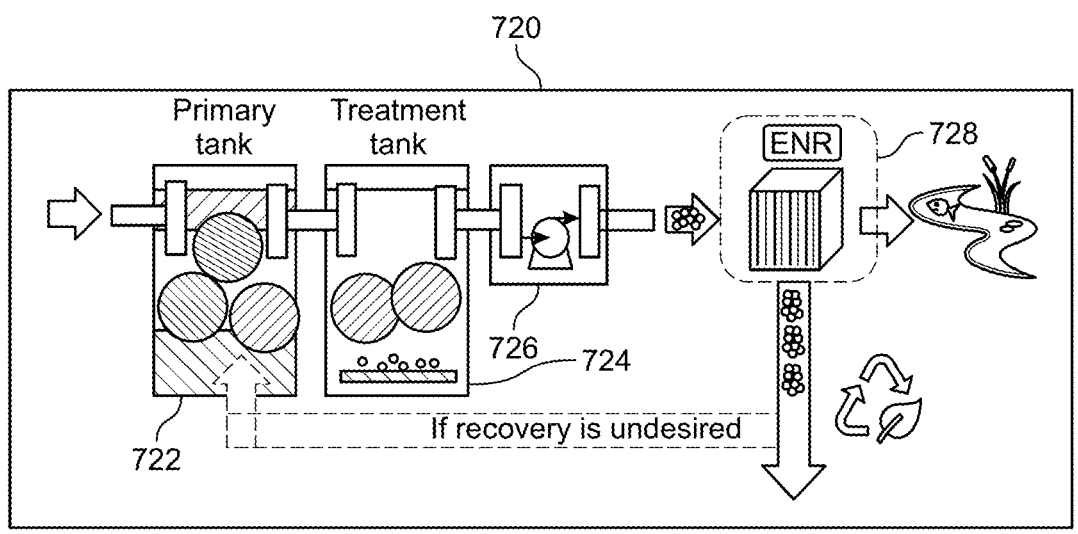

An example embodiment of a residential deployment is illustrated in FIGS. 7A and 7B. In the example system 710 shown in FIG. 7A, wastewater from septic tank 712 flows to the NR system 716, which treats the wastewater and produces a diluate stream and a concentrate stream. In this example a simple commercially off-the-shelf (COTS) filter 714 removes suspended solids prior to the NR system 716. FIG. 7B shows an example system 720 representing an engineered or advanced onsite system. In this example, the wastewater from the primary tank 722 is further treated in tank 724 (shown as an aerobic process, a common approach of these systems) before the treated wastewater flows to NR system 728. In this example, the form of nitrogen entering the NR system is nitrate ($NO_3^-$) instead of ammonium ($NH_4^+$). In both examples, the resulting diluate stream may be released to the environment or recycled. The concentrate stream be used to recover the nutrients concentrated in the stream or returned to the primary tank in the advanced system 720 for further treatment. In some embodiments, the NR system herein may be comprised in an onsite wastewater treatment system herein. In some embodiments, the NR system may be connected (directly or indirectly) with a septic tank.

In some embodiments, the systems and methods may improve the quality of water discharged and generate a nutrient-rich product ready for agricultural or landscaping applications. Unlike many conventional systems that are limited to cations such as ammonium, the disclosed systems may also provide simultaneous removal and recovery of various anions, such as nitrate and phosphate ions. One of products from the treatment may be an electrodialytic concentrate that turns blackwater into a liquid fertilizer product.

In some embodiments, electrodialytic nutrient removal may enable decentralized treatment of wastewater to give effluent quality that meets ISO 30500 standards or other national or local standards for reuse and/or discharge. However, the system is not limited to residential deployment. The NR device may be a stand-alone module and thus may be placed in line and combined with other technologies as part of a larger wastewater treatment scheme, such as after a filtration process and before a disinfection process. The NR concentrate solution may be used directly as a fertigation solution, or a solid fertilizer (e.g., struvite) may be formed by salt addition. This allows for nutrient recovery and reuse from the wastewater stream, rather than solely nutrient removal prior to discharge.

It is to be understood that the systems and methods described herein may also be used with various water streams and composites, such as mixtures of blackwater and greywater, agricultural wastewaters, or with blackwater that has undergone some pretreatment (e.g., septic tank; ultrafiltration; activated carbon) before entering the NR system. In some embodiments, total household wastewater may be treated with NR for nutrient removal and fertilizer recovery. In another example, a fraction of household greywater may be mixed with blackwater, depending on the different household greywater stream characteristics. This embodiment may be particularly useful in nitrogen-sensitive regions where septic system replacement is imminent.

Another aspect of the present disclosure provides all that is described and illustrated herein.

The following Examples are provided by way of illustration and not by way of limitation.

EXAMPLES

Polarity Reversal

Figure 8A:
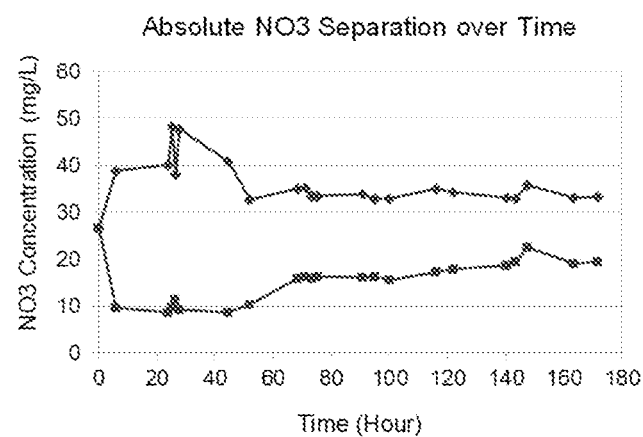
FIGS. 8A-8B show the concentration of $NO_3^-$ in diluate and concentrate streams.

Polarity reversal, wherein the voltage applied between the anode and cathode is switched periodically, was investigated as a method to prevent or reverse membrane fouling during electrodialysis. Two experiments were performed, each lasting ~170 h (~7 days). In the first experiment, polarity reversal was performed only up to 27 h; in the second experiment, polarity reversal was performed every 2 h for the duration of the 7-day-long experiment. FIG. 8A shows the concentrations of nitrate ions ($NO_3^-$) in the diluate and concentrate streams for Experiment 1. The concentration of $NO_3^-$ in the diluate stream gradually increases over time, indicating a loss in performance without polarity reversal.

Figure 8B:
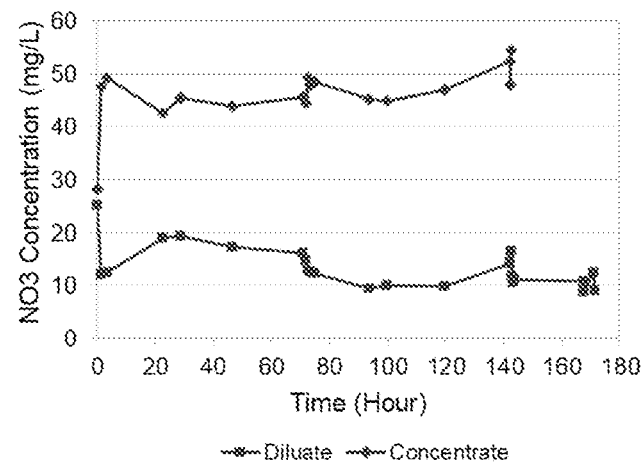

In contrast, no performance loss was observed when polarity reversals were applied regularly throughout Experiment 2. As shown in FIG. 8B, the concentration of $NO_3^-$ in the diluate remains low (~10 mg $L^{-1}$) throughout the 7-day-long duration of the experiment. $NO_3^-$ concentrations in the diluate from non-reversal experiments showed a 20-60% increase over time (4-6 hrs).

The results indicate that polarity reversal is an effective strategy for preventing performance loss due to membrane fouling. These experiments indicate that polarity reversal is highly beneficial when incorporated into the regular operating conditions of the NR system.

Phosphate Removal

Figure 9:
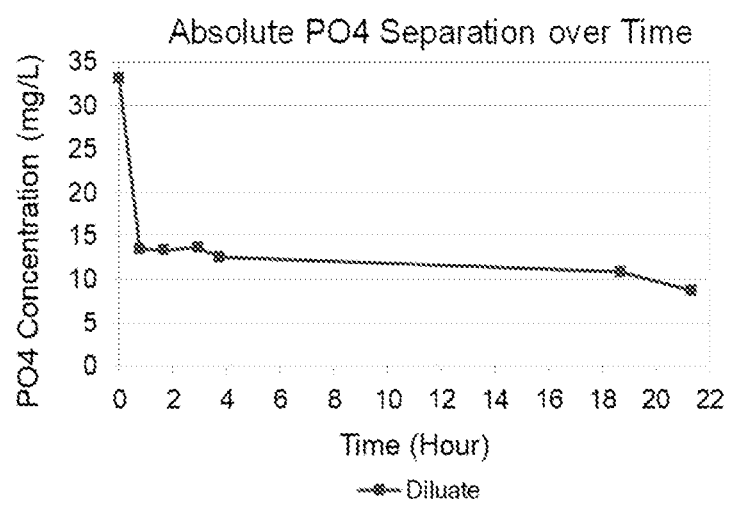
FIG. 9 shows the concentration and percent remaining of $PO_4^{3-}$ in the diluate stream. Operation cycle was (1) 105 min at +22 V followed by (2) 15 min at −22 V.

The concentration of phosphate in the septic effluent from the as-received advanced-treatment system was low (approximately 4 mg $L^{-1}$), making quantification of removal challenging. The effluent was therefore spiked with sodium phosphate to give ~30 mg $L^{-1}$ $PO_4^{3-}$, which is representative of the concentration expected for advanced-treatment septic effluent. FIG. 9 shows results for phosphate removal during operation with regular polarity reversal every 2 h. Phosphate removal was excellent over the observed experimental time period of ~22 h, with 60-74% of $PO_4^{3-}$ removed from the diluate stream. Phosphate removal occurred simultaneously with and did not inhibit nitrate removal.

Ammonium and Phosphate Removal From Septage

A 6-day-long experiment was performed using effluent taken directly from a household septic tank. This septage was pre-filtered using a standard off-the-shelf 50 μm sediment filter to remove suspended solids. The nutrient concentrations in this filtered septage were $NH_3$=63 mg $L^{-1}$; $NO_3^{-1}$=0 mg $L^{-1}$; $PO_4^{3-}$=35.3 mg $L^{-1}$. The filtered septage also had a COD concentration of 111 mg $L^{-1}$ and total suspended solids (TSS) below the detection limit of the measurement (<22 mg $L^{-1}$). For comparison, the COD concentration in the AQWA advanced-treatment effluent was 39 mg $L^{-1}$. The NR cell was operated with 10 cell pairs, cycling between +22 V forward bias for 2 h followed by polarity reversal of -22 V for 10 min.

Figure 10A:
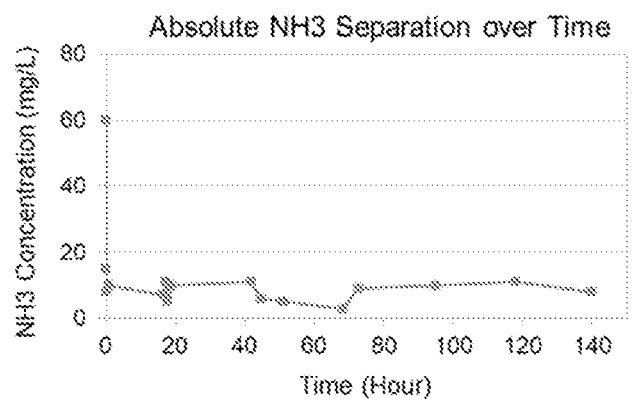
FIGS. 10A and 10B respectively show concentrations of $NH_3$ and $PO_4^{3-}$ in the diluate stream during ENR with septage. Operation cycle was (1) 120 min at +22 V followed by (2) 10 min at −22 V.
Figure 10B:
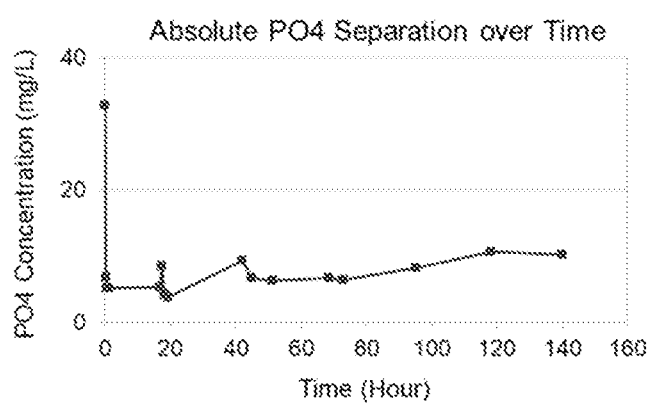

FIGS. 10A and 10B respectively show diluate concentrations of $NH_3$ and $PO_4^{3-}$ during this experiment. Effluent concentrations of both ions were near or below 10 mg $L^{-1}$ throughout the experiment (up to 140 h of operation). Phosphate removal was between 69-89%, while ammonia removal was between 83-95%.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The invention claimed is:

1. A method of treating wastewater from a residential or business building, the method comprising:
   providing a nutrient recovery system (NR system) onsite a residential or business building, the NR system comprising a pair of electrodes and one or more nutrient recovery channel units (NR channel units), each NR channel unit comprising:
      a first membrane, the first membrane being selectively permeable to a first wastewater nutrient,
      a second membrane, the second membrane being selectively permeable to a second wastewater nutrient,
      wherein the first membrane is a cation exchange membrane, and the second membrane is an anion exchange membrane, and
      at least one spacing frame,
         wherein the at least one spacing frame comprises a structural element, a gasket, and a flow channel, and
         wherein the first membrane, the second membrane, and the at least one spacing frame are each positioned between the pair of electrodes;
   flowing greywater and/or blackwater from a feed tank connected to the residential or business building into the NR system;
   applying a voltage to the pair of electrodes;
   switching a polarity of the voltage; and
   using the first membrane, the second membrane, and the voltage, producing at least two output streams,
   wherein a first output stream of the at least two output streams comprises a lower level of the first wastewater nutrient and/or the second wastewater nutrient compared to the greywater and/or blackwater from the feed tank,
   wherein a second output stream of the at least two output streams comprises a higher level of the first wastewater nutrient and/or the second wastewater nutrient compared to the greywater and/or blackwater from the feed tank,
   wherein, during a forward bias voltage, the first output stream is routed to a discharge pathway and the second output stream is routed to a waste, recycle, or recirculation pathway, and
   wherein, during a reverse bias voltage, the first output stream and the second output stream are recirculated to the feed tank.

2. The method of claim 1, wherein switching the polarity of the voltage causes membrane foulant to be removed from the first membrane and/or the second membrane of the NR system by applying the reverse bias voltage with a higher magnitude and shorter duration than the forward bias voltage.

3. The method of claim 1, wherein switching the polarity of the voltage comprises repeatedly applying the forward bias voltage and then applying the reverse bias voltage, and wherein the forward bias voltage is applied for from 1 hour to 3 hours, then the reverse bias voltage is applied for from 5 minutes to 15 minutes.

4. The method of claim 1, further comprising:
   detecting changes in the NR system using a sensor and/or using a sensor to instruct a controller to change operating parameters of the NR system; and
   wherein a loss of performance of the first membrane or the second membrane is less than 10% after six months of use.

5. The method of claim 1, wherein
   the first wastewater nutrient comprises ammonium; and
   the second wastewater nutrient comprises phosphate or nitrate.

6. The method of claim 1, wherein ammonium concentration in the first output stream of the at least two output streams is less than 30% of ammonium concentration in the greywater and/or blackwater from the feed tank.

7. The method of claim 1, wherein phosphate concentration in the first output stream of the at least two output streams is less than 30% of phosphate concentration in the greywater and/or blackwater from the feed tank.

8. The method of claim 1, wherein nitrate concentration in the first output stream of the at least two output streams is less than 30% of nitrate concentration in the greywater and/or blackwater from the feed tank.

9. The method of claim 1, wherein the NR system is directly or indirectly connected with a septic tank.

10. The method of claim 1, wherein the voltage is between 10 volts direct current (VDC) to 50 VDC.

11. The method of claim 1, wherein the voltage is between 20 volts direct current (VDC) to 30 VDC.

12. The method of claim 1, wherein the NR system is comprised in an onsite wastewater treatment system for a residence.

13. The method of claim 1, wherein the NR system further comprises at least a first sensor, and the first sensor is one of an ion sensor, a current sensor, a visual sensor, and an acoustic sensor.

14. The method of claim 13, wherein the NR system further comprises a controller configured to adjust the voltage applied to the pair of electrodes based on feedback from the first sensor.

15. The method of claim 1, wherein the NR system further comprises a plurality of NR channel units configured to operate in series, parallel, or combinations thereof.

16. The method of claim 1, wherein the flow channel has a planar flow area with a length from 10 cm to 50 cm and a width from 20 cm to 100 cm.

17. The method of claim 1, wherein the NR system further comprises one or more end channels with an electrolyte solution.

18. The method of claim 1, wherein switching the polarity of the voltage includes the reverse bias voltage with a higher magnitude than the forward bias voltage.

19. A method of treating wastewater from a residential or business building, the method comprising:
   providing a nutrient recovery system (NR system) onsite a residential or business building, the NR system comprising a pair of electrodes and one or more nutrient recovery channel units (NR channel units), each NR channel unit comprising:
      a first membrane, the first membrane being selectively permeable to a first wastewater nutrient,
      a second membrane, the second membrane being selectively permeable to a second wastewater nutrient,
      wherein the first membrane is a cation exchange membrane, and the second membrane is an anion exchange membrane, and
      at least one spacing frame,
         wherein the at least one spacing frame comprises a structural element, a gasket, and a flow channel,
         wherein the first membrane, the second membrane, the at least one spacing frame are each positioned between the pair of electrodes, and
         wherein the structural element is a membrane-separating mesh material;

flowing greywater and/or blackwater from a feed tank connected to the residential or business building into the NR system;

applying a voltage to the pair of electrodes;

switching a polarity of the voltage; and using the first membrane, the second membrane, and the voltage, producing at least two output streams, wherein a first output stream of the at least two output streams comprises a lower level of the first wastewater nutrient and/or the second wastewater nutrient compared to the greywater and/or blackwater from the feed tank, wherein a second output stream of the at least two output streams comprises a higher level of the first wastewater nutrient and/or the second wastewater nutrient compared to the greywater and/or blackwater from the feed tank, wherein, during a forward bias voltage, the first output stream is routed to a discharge pathway and the second output stream is routed to a waste, recycle, or recirculation pathway, and wherein, during a reverse bias voltage, the first output stream and the second output stream are recirculated to the feed tank.

20. A method of treating wastewater from a residential or business building, the method comprising:

providing a nutrient recovery system (NR system) onsite a residential or business building, the NR system comprising a pair of electrodes and one or more nutrient recovery channel units (NR channel units), each NR channel unit comprising:

a first membrane, the first membrane being selectively permeable to a first wastewater nutrient, a second membrane, the second membrane being selectively permeable to a second wastewater nutrient, wherein the first membrane is a cation exchange membrane, and the second membrane is an anion exchange membrane, and at least one spacing frame, wherein the at least one spacing frame comprises a structural element, a gasket, and a flow channel, wherein the first membrane, the second membrane, and the at least one spacing frame are each positioned between the pair of electrodes, and wherein the structural element is an alternating support structure to promote tortuous flow through the flow channel;

flowing greywater and/or blackwater from a feed tank connected to the residential or business building into the NR system;

applying a voltage to the pair of electrodes;

switching a polarity of the voltage; and using the first membrane, the second membrane, and the voltage, producing at least two output streams, wherein a first output stream of the at least two output streams comprises a lower level of the first wastewater nutrient and/or the second wastewater nutrient compared to the greywater and/or blackwater from the feed tank, wherein a second output stream of the at least two output streams comprises a higher level of the first wastewater nutrient and/or the second wastewater nutrient compared to the greywater and/or blackwater from the feed tank, wherein, during a forward bias voltage, the first output stream is routed to a discharge pathway and the second output stream is routed to a waste, recycle, or recirculation pathway, and wherein, during a reverse bias voltage, the first output stream and the second output stream are recirculated to the feed tank.

* * * * *